United States Patent

Horie et al.

[11] Patent Number: 6,122,162
[45] Date of Patent: Sep. 19, 2000

[54] PORTABLE DEVICE AND CONCENTRATOR THEREFOR

[75] Inventors: Kenzo Horie, Yokohama; Munehiro Torii, Tokyo; Kiyotsugu Hayashi, Yokohama; Keiji Nambu, Tokyo; Takayuki Takahashi; Hirokazu Gotoh, both of Yokohama, all of Japan

[73] Assignee: Matsushita Electric Industrial Co., Ltd., Japan

[21] Appl. No.: 08/877,854

[22] Filed: Jun. 18, 1997

[30] Foreign Application Priority Data

Jun. 28, 1996 [JP] Japan .................................. 8-170396

[51] Int. Cl.⁷ ....................................................... G06F 1/16
[52] U.S. Cl. ............................ 361/683; 345/173; 345/169
[58] Field of Search .................................... 361/683, 681, 361/680; 345/173, 905, 169; 364/708.1

[56] References Cited

U.S. PATENT DOCUMENTS

| | | | |
|---|---|---|---|
| 4,506,344 | 3/1985 | Hubbard | 364/708.1 |
| 5,105,338 | 4/1992 | Held | 361/683 |
| 5,128,829 | 7/1992 | Loew | 361/683 |
| 5,202,817 | 4/1993 | Koenck et al. | 361/680 |
| 5,331,580 | 7/1994 | Miller et al. | 364/708.1 |
| 5,555,157 | 9/1996 | Moller et al. | 361/683 |
| 5,572,573 | 11/1996 | Sylvan et al. | 345/173 |
| 5,646,649 | 7/1997 | Iwata et al. | 345/173 |
| 5,661,632 | 8/1997 | Register | 361/683 |

FOREIGN PATENT DOCUMENTS

| | | |
|---|---|---|
| 0 432 803 A2 | 6/1991 | European Pat. Off. . |
| 0 689 121 A1 | 12/1995 | European Pat. Off. . |
| 0697644 | 2/1996 | European Pat. Off. . |
| 1285191 | 8/1972 | United Kingdom . |

*Primary Examiner*—Leo P. Picard
*Assistant Examiner*—Lisa Lea-Edmonds
*Attorney, Agent, or Firm*—Parkhurst & Wendel, L.L.P.

[57] ABSTRACT

A portable device includes a portable device body, a touch panel provided on a surface of the device body, and a cover pivotally coupled to the device body for covering the touch panel when it is closed and uncovering the touch panel when it is opened. The portable device further includes a window provided at the cover to allow the touch panel to be seen through the window when the cover is closed. The portable device further includes a button provided at a position on the cover corresponding to the touch panel. The button is operable from an outer side of the cover to control an operation of the touch panel while the cover is closed. A concentrator includes a concentrator body and a device receiving unit attached to the concentrator body for receiving therein the portable device so as to perform data transmission and reception and/or power feeding relative to the portable device. The device receiving unit is capable of receiving the portable device of any size within a given range and performing the data transmission and reception and/or the power feeding relative to the portable device received therein.

7 Claims, 12 Drawing Sheets

PORTABLE DEVICE AND CONCENTRATOR THEREFOR

BACKGROUND OF THE INVENTION

1. Field of the Invention

The present invention relates to a portable device and further relates to a concentrator for performing data transmission and reception and/or power feeding relative to the portable device.

2. Description of the Prior Arts

In recent years, portable devices which can be used as terminals of a host computer have been widely available. These portable devices are used, for example, for managing schedules, inputting and outputting various data on business, inputting data thereinto from the host computer or feeding data therefrom into the host computer.

Figure 13:
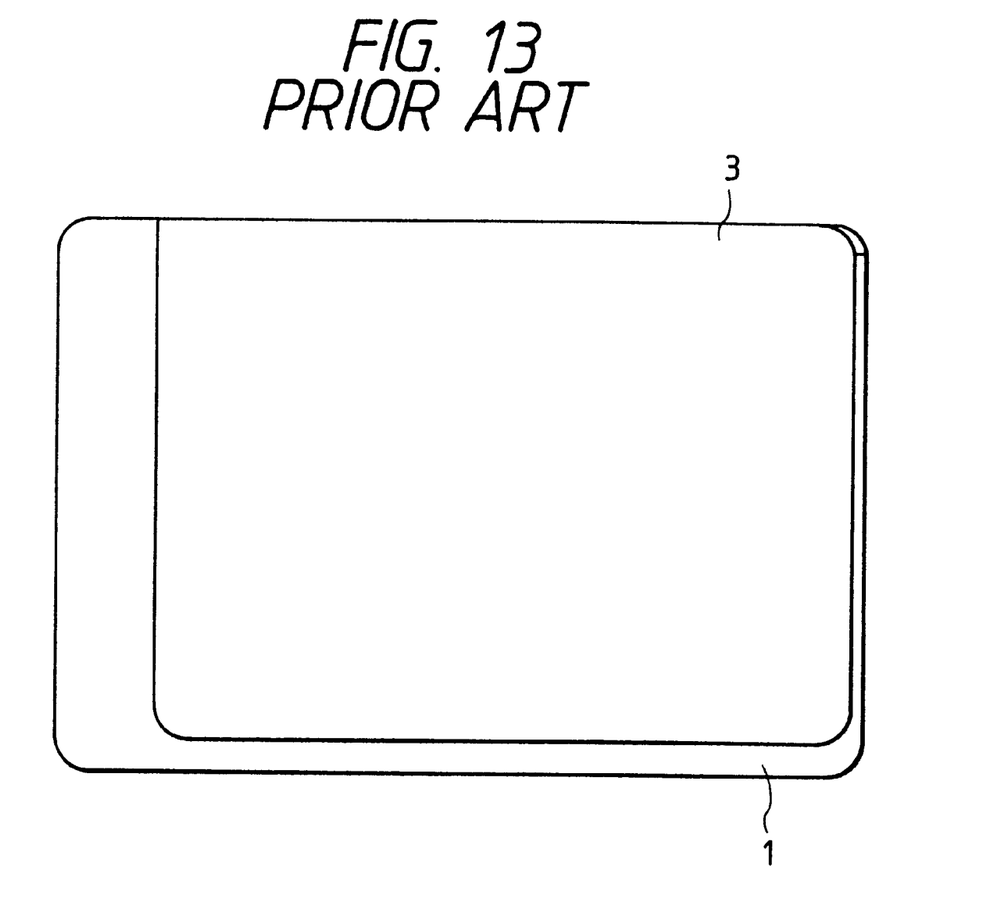
FIG. 13 is a plan view of a conventional portable device in the state where a cover thereof is closed.
Figure 14:
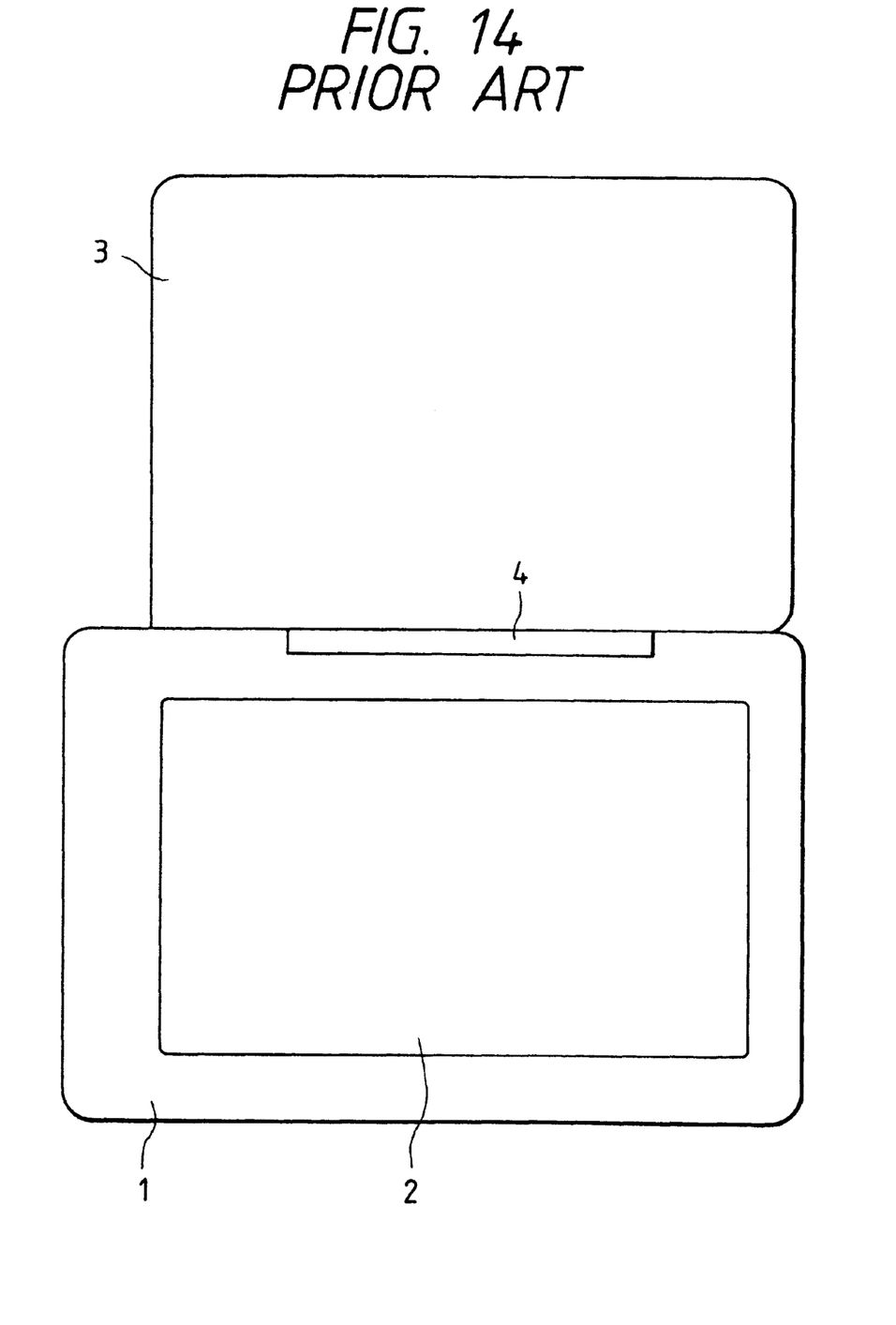
FIG. 14 is a plan view of the conventional portable device in the state where the cover is opened.
Figure 15:
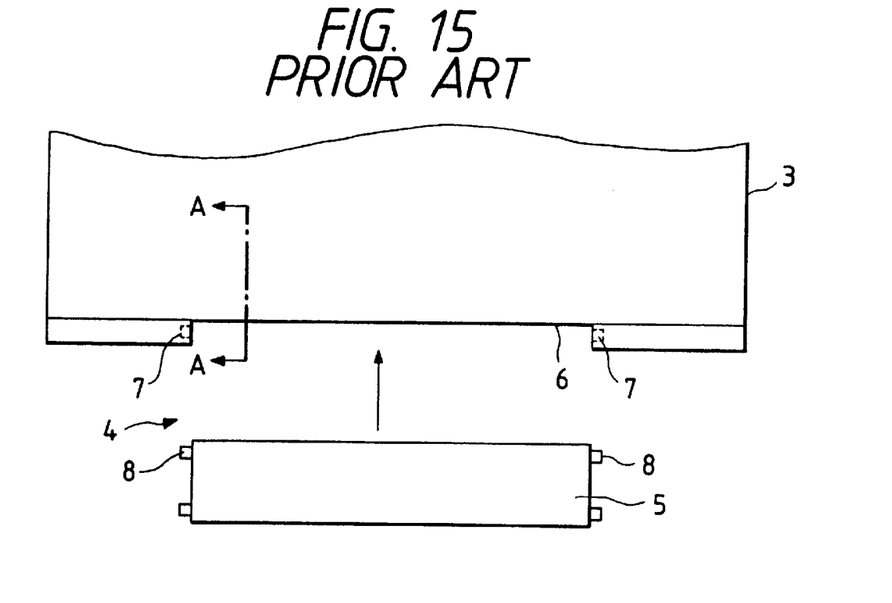
FIG. 15 is a plan view showing a hinge mechanism for coupling the cover to a portable device body in the conventional portable device.
Figure 16:
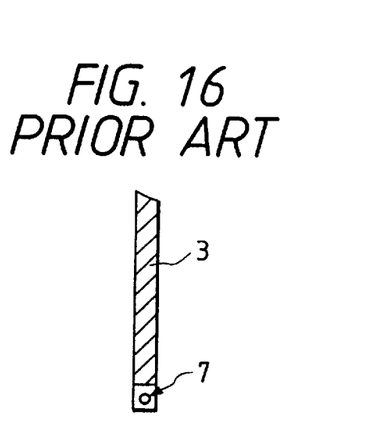
FIG. 16 is a sectional view taken along line A—A in FIG. 15 for showing a coupling portion of the conventional hinge mechanism.
Figure 17:
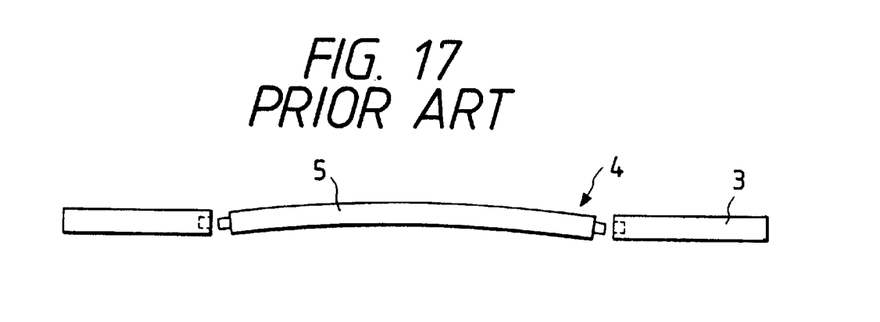
FIG. 17 is a front view for explaining an assembled state of the conventional hinge mechanism.

FIGS. 13–17 are diagrams showing one of the conventional portable devices, wherein FIG. 13 is a plan view of the conventional portable device with a cover 3 thereof being closed, FIG. 14 is a plan view of the conventional portable device with the cover 3 being opened, FIG. 15 is a plan view showing a hinge mechanism 4 for coupling the cover 3 to a portable device body 1 in the conventional portable device, FIG. 16 is a sectional view taken along line A—A in FIG. 15 for showing a coupling portion of the conventional hinge mechanism 4, and FIG. 17 is a front view for explaining an assembled state of the conventional hinge mechanism 4.

The conventional portable device includes the portable device body 1, a touch panel 2 provided on the surface of the device body 1, and the cover 3 pivotally coupled to the device body 1 so as to cover the touch panel 2 when it is closed and uncover the touch panel 2 when it is opened. The cover 3 is in the form of an opaque plate so that the whole display portion formed by the touch panel 2 is covered by the cover 3 when it is closed. The cover 3 is coupled to the device body 1 via the hinge mechanism 4. The hinge mechanism 4 includes the cover 3 and a hinge strip 5 coupled to the cover 3. At a coupling portion of the cover 3 is provided a recessed portion 6 for receiving therein the hinge strip 5 in a nearly tight fashion. Further, holes 7 are formed on opposite inner surfaces of the cover 3 defining therebetween the recessed portion 6, respectively, while corresponding projections 8 are provided on opposite end surfaces of the hinge strip 5 so as to be fitted into the holes 7, respectively. For coupling the cover 3 and the hinge strip 5, the hinge strip 5 is first brought into the recessed portion 6 of the cover 3 and then slightly bent as shown in FIG. 17 and, after matching positions of the projections 8 and the holes 7, the deformation of the hinge strip 5 is released to allow the projections 8 to be fitted into the corresponding holes 7, respectively. In this manner, the cover 3 is pivotally mounted or attached to the device body 1 to cover and uncover the touch panel 2. As appreciated, the hinge strip 5 is fixed to the device body 1.

However, in the foregoing conventional portable device, when a user wishes to see the contents displayed on the touch panel 2 or input a command via the touch panel 2, it is always necessary to open the cover 3, which is somewhat troublesome. Further, in the manufacturing process of the portable device, a certain large power as well as a delicate power adjustment are required for a worker to deform or bend the hinge strip 5 so that it is difficult to mount or attach the cover 3 to the device body 1 smoothly in a short time.

SUMMARY OF THE INVENTION

Therefore, it is an object of the present invention to provide an improved portable device which is convenient for use and can be easily assembled.

It is another object of the present invention to provide an improved concentrator which is capable of dealing with a portable device of any size within a given range.

According to one aspect of the present invention, a portable device comprises a portable device body; a touch panel provided on a surface of the device body; a cover coupled to the device body for covering the touch panel when it is closed and uncovering the touch panel when it is opened; a window provided at the cover to allow the touch panel to be seen through the window when the cover is closed; and a button provided at a position on the cover corresponding to the touch panel, the button being operable from an outer side of the cover to control an operation of the touch panel while the cover is closed.

It may be arranged that a mounting hole is formed through the cover from the outer side to a reverse side, and that the button is made of an elastic material and disposed in the mounting hole so as to be elastically deformable in directions toward and away from the touch panel when the cover is closed.

It may be arranged that the button is provided at an outer periphery thereof with a radially inward engaging groove extending circumferentially, and that the button is supported in the mounting hole by engagement between the engaging groove and a mounting flange formed in the mounting hole of the cover.

It may be arranged that the mounting flange has an annular shape with an upper surface which gradually inclines downward in a radially inward direction.

It may be arranged that the button is provided at an outer periphery thereof with a radially outward mounting flange extending circumferentially, and that the button is supported in the mounting hole by engagement between the mounting flange and an engaging groove formed in the mounting hole of the cover.

It may be arranged that the button has a protruding portion at its tip at a side of the cover opposite to the outer side.

It may be arranged that the cover is coupled to the device body via a hinge mechanism.

It may be arranged that the hinge mechanism comprises the cover, a hinge, strip and a hinge pin for coupling the cover and the hinge strip, that a first recessed portion is provided at a coupling portion of one of the cover and the hinge strip for receiving therein a coupling portion of the other of the cover and the hinge strip, the one of the cover and the hinge strip further provided with a guide groove extending through a portion thereof from its outer side and opening to the first recessed portion while the other of the cover and the hinge strip being provided at the coupling portion thereof with a second recessed portion corresponding to the guide groove, and that the cover and the hinge strip are coupled to each other by inserting the hinge pin through the guide groove to engage into the second recessed portion.

It may be arranged that a locking mechanism is provided at the guide groove and the hinge pin for locking the hinge pin at the guide groove.

According to another aspect of the present invention, a concentrator comprises a concentrator body; and a device receiving unit attached to the concentrator body for receiving therein a portable device so as; to perform at least one of data transmission and reception and power feeding relative to the portable device, wherein the device receiving unit is capable of receiving the portable device of any size within a given range and performing the at least one of the data transmission and reception and the power feeding relative to the portable device received therein.

It may be arranged that the device receiving unit comprises a confronting wall orienting against an insertion direction of the portable device for receiving the portable device thereon, a bottom wall for supporting the portable device, a front-side wall for abutting a front side of the portable device and a rear-side wall for abutting a rear side of the portable device, wherein the confronting, bottom, front-side and rear-side walls define a space for receiving therein the portable device, and that the space is opened to the exterior at a side opposite to the bottom wall and a side opposite to the confronting wall.

It may, be arranged that the device receiving unit is secured to the concentrator body in a posture inclined from a horizontal plane relative to two orthogonal coordinate axes.

It may be arranged that the device receiving unit is gradually inclined downward in a direction toward the confronting wall and further gradually inclined downward in a direction toward one of the front-side weal and the rear-side wall.

It may be arranged that the device receiving unit is provided with a charging terminal insertion opening, a positioning portion and an optical communication section, and that at least one of the charging terminal insertion opening, the positioning portion and the optical communication section is precisely positioned using the confronting wall and the one of the front-side wall and the rear-side wall as first reference planes.

It may be arranged that the portable device is provided with a charging terminal, a positioning portion and an optical communication element at its wall for abutting the bottom wall of the device receiving unit, and that at least one of the charging terminal, the positioning portion and the optical communication element of the portable device is precisely positioned using a wall of the portable device for abutting the confronting wall and a wall of the portable device for abutting the one of the front-side wall and the rear-side wall as second reference planes.

It may be arranged that a position of the at least one of the charging terminal insertion opening, the positioning portion and the optical communication section of the device receiving unit relative to the first reference planes matches with a position of the at least one of the charging terminal, the positioning portion and the optical communication element of the portable device.

It may be arranged that the concentrator further comprises at least one more device receiving unit attached to the concentrator body for receiving therein at least one more portable device so as to perform at least one of data transmission and reception and power feeding relative to the at least one more portable device.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

Figure 1:
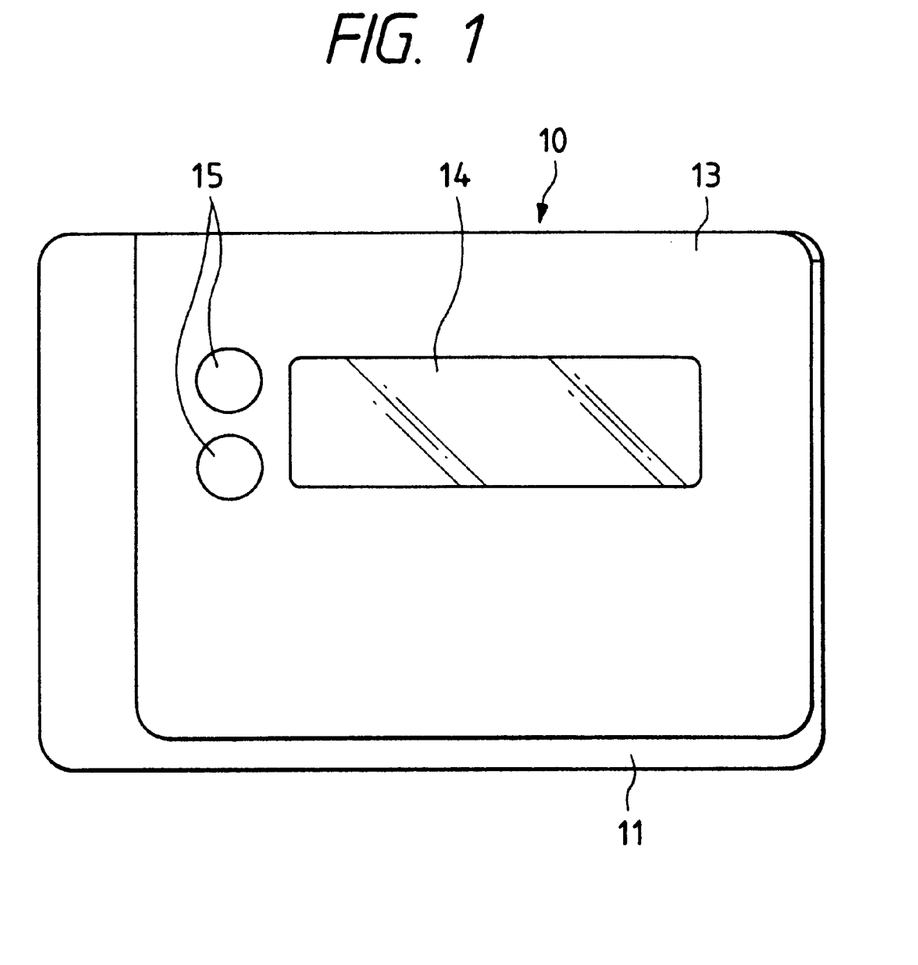
FIG. 1 is a plan view of a portable device with a cover thereof being closed according to a first preferred embodiment of the present invention.
Figure 2:
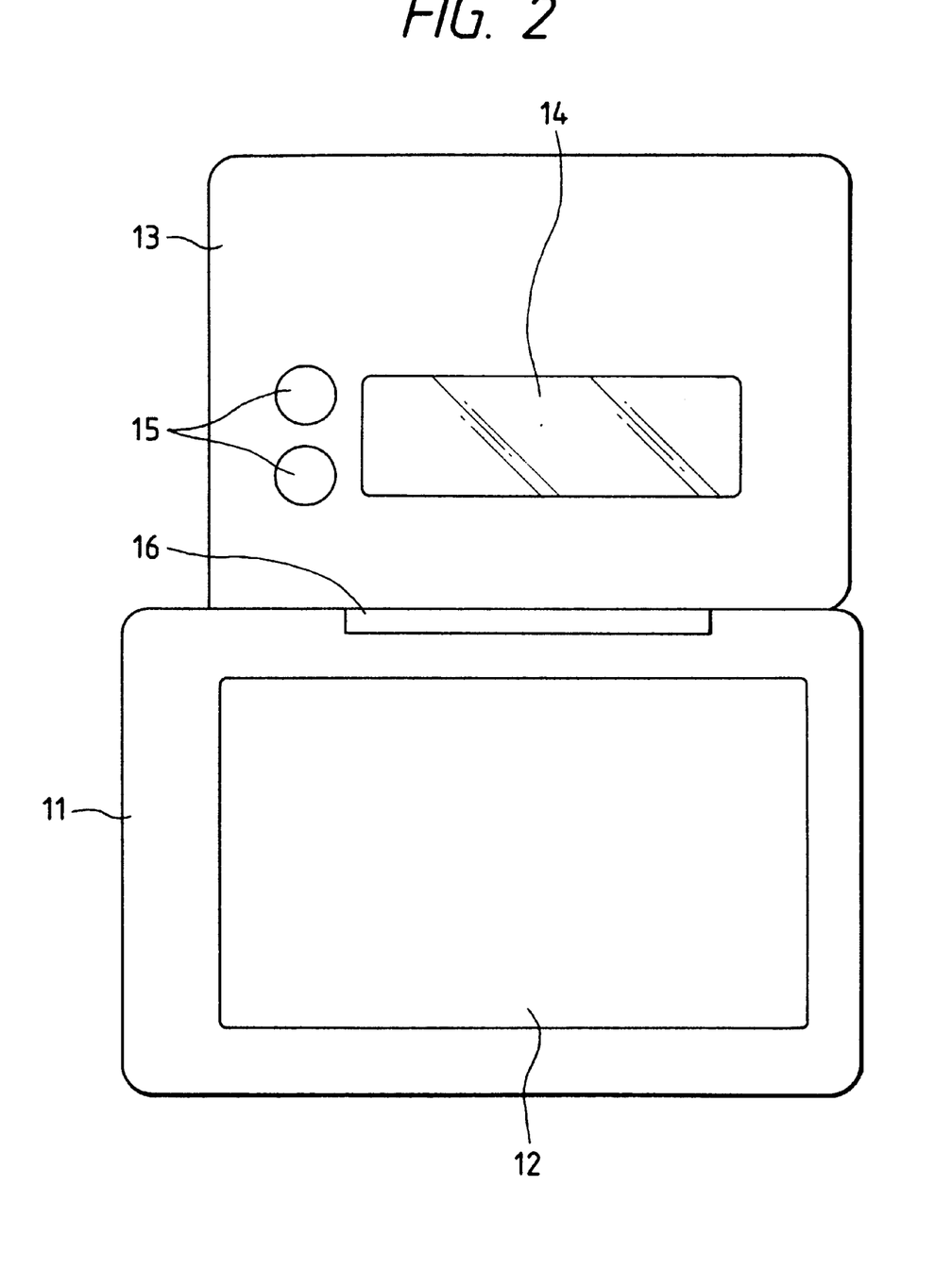
FIG. 2 is a plan view of the portable device with the cover being opened.

FIGS. 1 and 2 are diagrams schematically showing an external appearance of a portable device 10 according to a first preferred embodiment of the present invention, wherein FIG. 1 is a plan view of the portable device 10 with a cover 13 thereof being closed and FIG. 2 is a plan view of the portable device 10 with the cover 13 being opened.

The portable device 10 includes a portable device body 11, a touch panel 12 provided on the surface of the device body 11 and working as a display and operating portion, and the cover 13 pivotally coupled to the device body 11 so as to cover the touch panel 12 when it is closed and uncover the touch panel 12 when it is opened. The cover 13 is provided with a window 14. The window 14 is formed of transparent acrylic resin or one of other transparent resins so that a user can see the touch panel 12 through the window 14 even when the cover 13 is fully closed. Further, the cover 13 is provided with buttons 15 at portions thereof corresponding to given portions of the touch panel 12 so that the user can operate the touch panel 12 using the buttons 15 from the side of the outer surface of the cover 13 even when the cover 13 is closed. The cover 13 is coupled to the device body 11 via a hinge mechanism 16.

Figure 3:
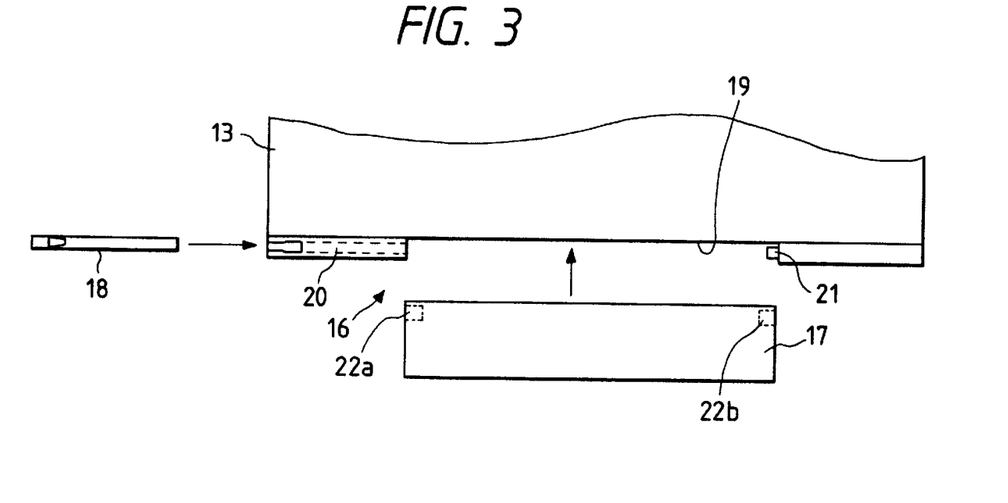
FIG. 3 is a plan view showing a hinge mechanism for coupling the cover to a portable device body in the portable device.
Figure 4:
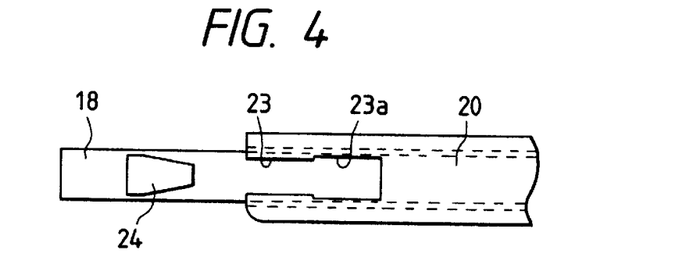
FIG. 4 is an enlarged plan view for explaining an engagement between a hinge pin and a guide groove in the hinge mechanism.
Figure 5:
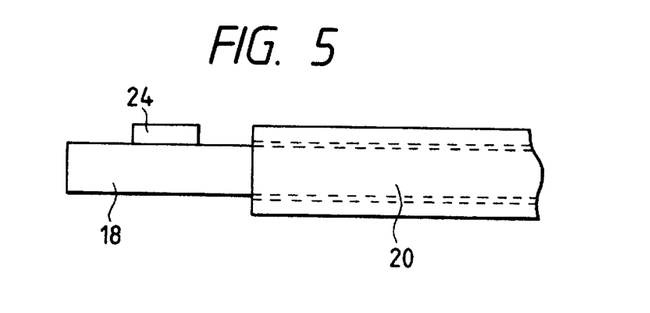
FIG. 5 is an enlarged front view for explaining the engagement between the hinge pin and the guide groove in the hinge mechanism.

FIGS. 3–5 are diagrams for explaining a structure for attaching the cover 13 to the device body 11 in the portable device 10, wherein FIG. 3 is a plan view showing the hinge mechanism 16 for coupling the cover 13 to the device body 11, FIG. 4 is an enlarged plan view for explaining an engagement between a hinge pin 18 and a guide groove 20 in the hinge mechanism 16, and FIG. 5 is an enlarged front view for explaining the engagement between the hinge pin 18 and the guide groove 20 in the hinge mechanism 16.

The hinge mechanism 16 includes the cover 13, a hinge strip 17 and the hinge pin 18 for coupling the cover 13 and the hinge strip 17. At a coupling portion of the cover 13 is provided a recessed portion 19 for receiving therein the hinge strip 17 in a nearly tight fashion. A projection 21 is provided on one of opposite inner surfaces of the cover 13 defining therebetween the recessed portion 19. On the other hand, at the other inner surface of the cover 13, the guide groove 20 extending through a portion of the cover 13 from the outer side thereof opens to the recessed portion 19. Further, on opposite end surfaces of the hinge strip 17 are formed holes 22a and 22b at positions corresponding to the guide groove 20 and the projection 21 for receiving therein the hinge pin 18 via the guide groove 20 and the projection 21 respectively.

The cover 13 is further formed with a cut portion 23 at an insertion entrance of the guide groove 20 for the hinge pin 18. On the other hand, the hinge pin 18 is provided with a stopper projection 24 at a base end portion thereof for engagement with the cut portion 23. Specifically, the cut portion 23 has a stepped shape with a step 23a where a width of the cut portion 23 is increased as seen from the entrance side of the guide groove 20. Further, the stopper projection 24 has a wedge shape which is tapered toward the tip side of the hinge pin 18 from the base end side thereof. Accordingly, when the hinge pin 18 is inserted into the guide groove 20 so as to cause the stopper projection 24 to be fitted into the cut portion 23, a base end surface of the stopper projection 24 engages with the step 23a of the cut portion 23 so that the hinge pin 18 is locked to be reluctant to come out. Thus, the cut portion 23 and the stopper projection 24 cooperatively constitute a locking mechanism of the hinge mechanism 16.

For coupling the cover 13 and the hinge strip 17, the projection 21 is first fitted into the hole 22b of the hinge strip 17 and positions of the hole 22a and the guide groove 20 are matched with each other, and then the hinge pin 18 is inserted through the guide groove 20 and fitted into the hole 22a of the hinge strip 17. At this time, the base end surface of the stopper projection 24 is in engagement with the step 23a of the cut portion 23 and thus the hinge pin 18 is not liable to come out from the cut portion 23 so that the cover 13 and the hinge strip 17 are securely coupled to each other. In this manner, the cover 13 is pivotally attached to the device body 11 to cover and uncover the touch panel 12. As appreciated, the hinge strip 17 is fixed to the device body 11.

It may be arranged that the hinge strip 17 is formed with the recessed portion 19, the guide groove 20 and the projection 21 while the cover 13 is formed with a protruding portion having the holes 22a and 22b. With this arrangement, after the protruding portion of the cover 13 is received in the recessed portion 19 of the hinge strip 17, the hinge pin 18 is inserted through the guide groove 20 and fitted into the hole 22a of the cover 13.

Figure 6:
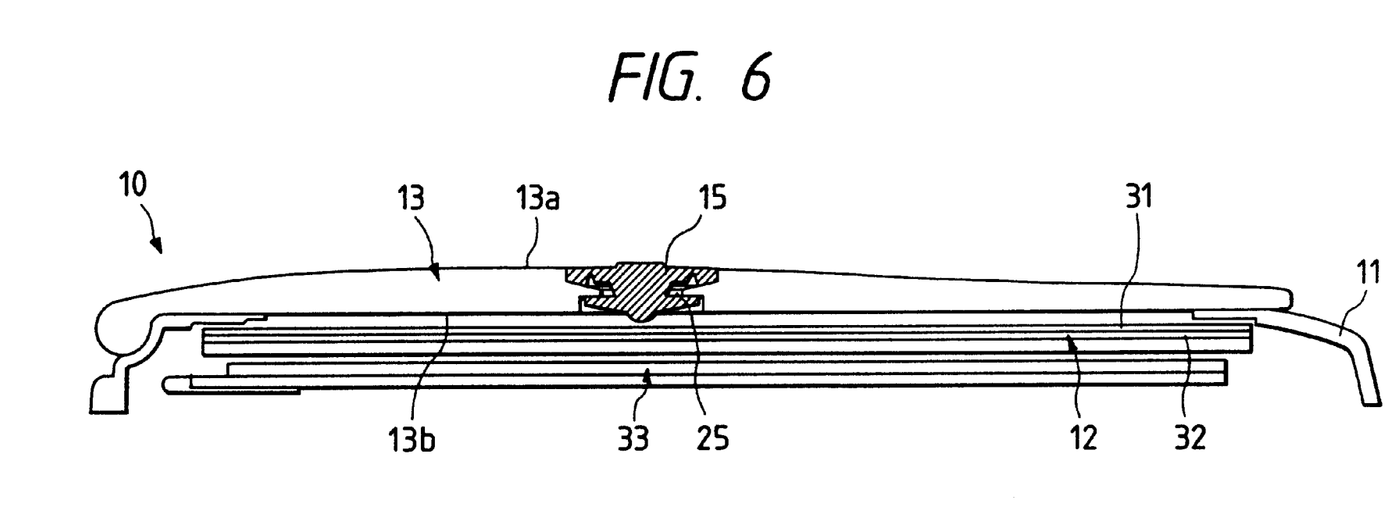
FIG. 6 is a sectional view showing the cover with a button attached thereto.
Figure 7:
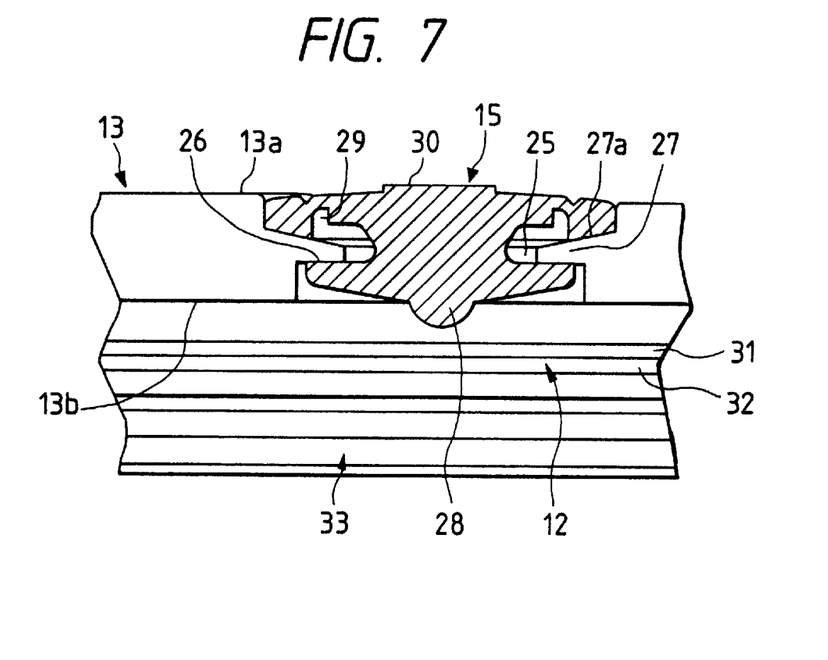
FIG. 7 is an enlarged sectional view showing the button in a non-operated state.
Figure 8:
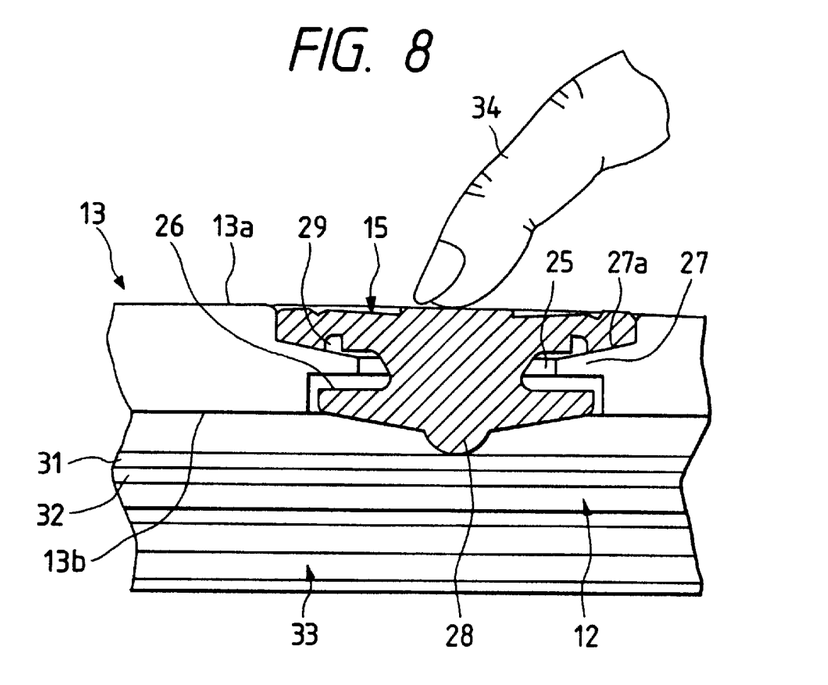
FIG. 8 is an enlarged sectional view showing the button in an operated state.

FIGS. 6–8 are diagrams for explaining a structure of the button 15 and a structure for attaching the button 15 to the cover 13 in the portable device 10, wherein FIG. 6 is a sectional view showing the cover 13 in the slate where the button 15 is attached to the cover 13, FIG. 7 is an enlarged sectional view showing the button 15 in a non-operated state, and FIG. 8 is an enlarged sectional view showing the button 15 in an operated state.

Since both buttons 15 (see FIGS. 1 and 2) have the same structure and are attached to the cover 13 in the same manner, the following explanation will be given to only one of them.

The button 15 is made of an elastic material, such as rubber or one of other resins. As shown in the figures, a mounting hole 25 is formed through the cover 13 from an upper side 13a to an underside 13b, and the button 15 is mounted in the mounting hole 25 so as to be elastically deformable upward and downward. The button 15 is formed on an outer periphery thereof with a radially inward engaging groove 26 extending circumferentially, that is, over the circumference of the button 15. The button 15 is supported in the mounting hole 25 by engagement between the engaging groove 26 of the button 15 and an annular mounting flange 27 formed in the mounting hole 25 of the cover 13. The mounting flange 27 has an upper surface 27a which gradually inclines downward in a radially inward direction, so as to form a dish-like shape to thereby give flexibility to the mounting flange 27.

On the other hand, it may be arranged that the cover 13 is formed in the mounting hole 25 with an engaging groove corresponding to the groove 26 of the button 15 while the button 15 is formed on its outer periphery with a radially outward mounting flange corresponding to the flange 27 of the cover 13 for engagement therebetween to support the button 15 in the mounting hole 25.

The button 15 has a protruding portion 28 formed at the lower center thereof, that is, at the underside 13b of the cover 13. The button 15 is further formed on an upper periphery of the engaging groove 26 with an annular groove 29 extending upward. The annular groove 29 is provided for giving flexibility to the button 15. Specifically, the button 15 firmly engages with the mounting flange 27 of the cover 13 at portions radially outward of the groove 29, while it is liable to be elastically deformed upward and downward at portions radially inward of the groove 29. The button 15 is formed with an operating portion 30 at the upper center thereof.

The touch panel 12 includes a touch panel upper electrode 31 and a touch panel lower electrode 32. Commands can be inputted through the touch panel 12 by pushing or depressing the upper electrode 31 to cause contact between the upper and lower electrodes 31 and 32, thereby allowing the current to flow. Further, a liquid crystal display (LCD) 33 is disposed under the touch panel 12 so that characters and graphics displayed on the LCD 33 can be seen through the touch panel 12.

When operating the portable device 10 thus structured, data input is basically carried out by opening the cover 13 and pushing the touch panel 12. As described above, the contents displayed on the touch panel 12 can be seen through the window 14 while the cover 13 is closed. Further, the touch panel 12 can be operated by pushing the button 15 from the upper side 13a of the cover 13 while the cover 13 is closed. As shown in FIG. 7, in the non-operated state of the button 15, the protruding portion 28 thereof is held at a position slightly spacing from the touch panel 12. On the other hand, as shown in FIG. 8, when the button 15 is pushed by a human finger 34, the button 15 is deformed at the groove 29 so that the upper center of the button 15 is depressed downward. Thus, the protruding portion 28 of the button 15 abuts the touch panel 12 to depress the surface thereof. This causes the touch panel upper electrode 31 to abut the touch panel lower electrode 32 to allow the flow of current so that commends can be inputted.

As described above, in the portable device 10 according to the first preferred embodiment, even while the cover 13 is closed, the displayed contents of the touch panel 12 can be seen and commands can be inputted to the touch panel 12. Thus, the portable device 10 is quite convenient for use.

Figure 9:
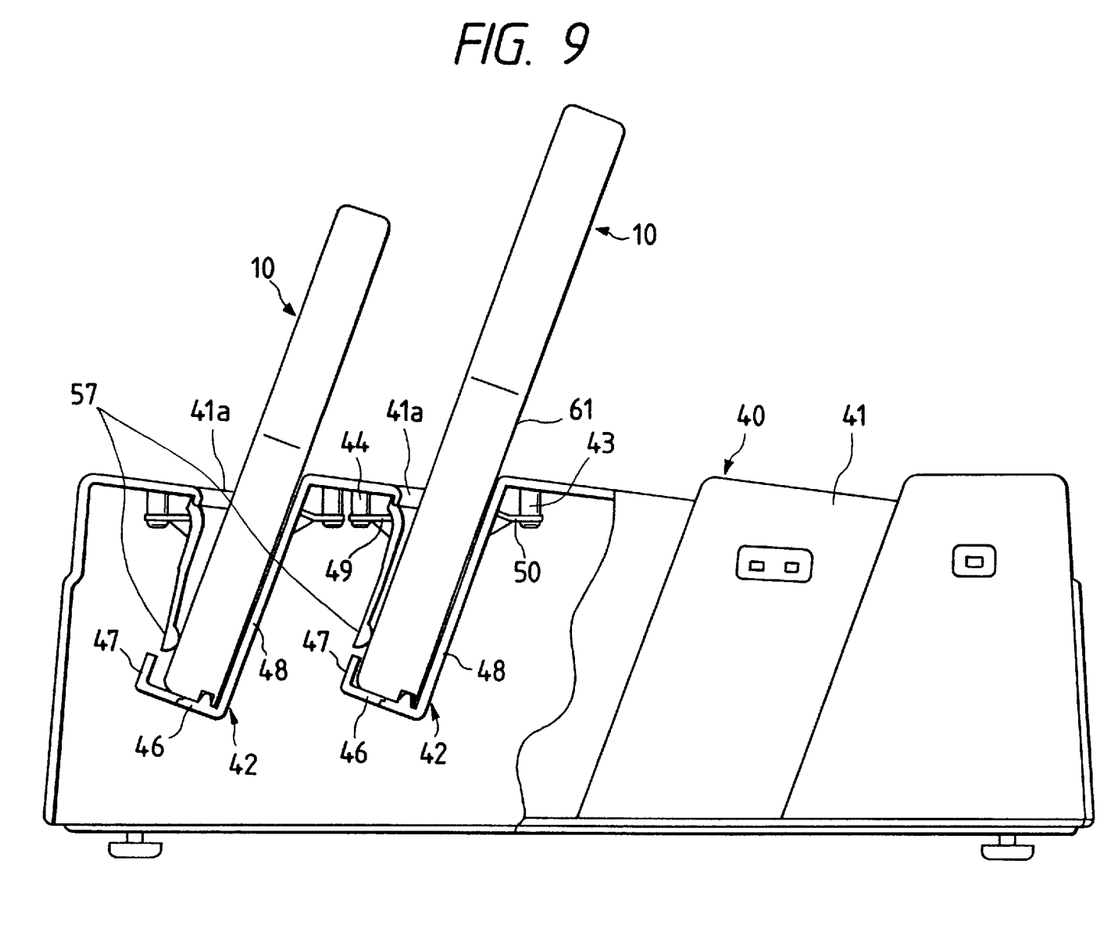
FIG. 9 is a partly broken front view of a concentrator showing a schematic structure thereof in the state where the portable devices of small and large sizes are set in device receiving units of the concentrator. according to a second preferred embodiment of the present invention.
Figures 10A, 10B, 10C:
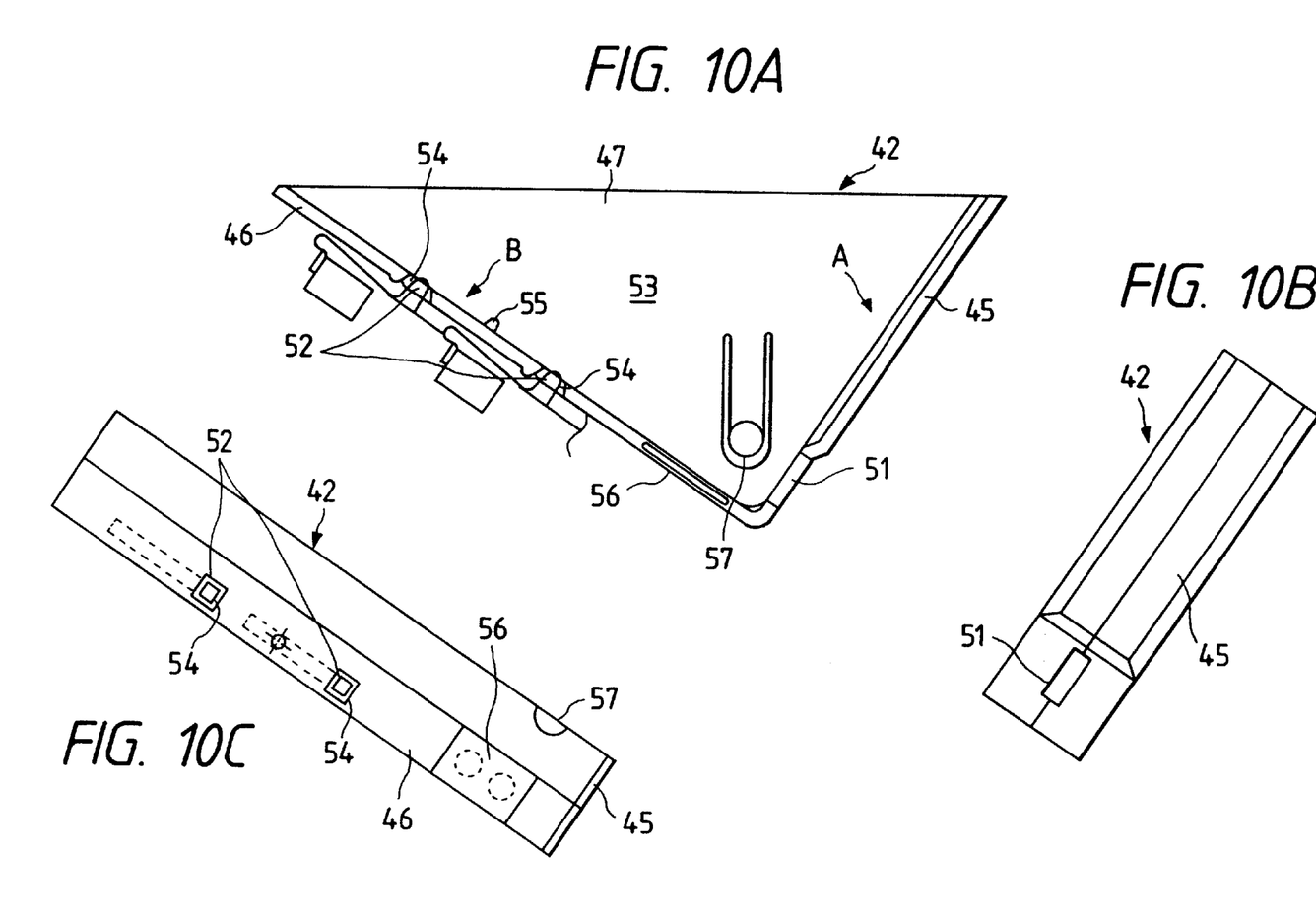
FIG. 10A is a diagram showing an internal structure of one of the device receiving units of the concentrator, as seen from the rear of the device receiving unit with a rear-side wall thereof being omitted.
FIG. 10B is a diagram showing the device receiving unit as seen in a direction A indicated in FIG. 10A.
FIG. 10C is a diagram showing the device receiving unit as seen in a direction B indicated in FIG. 10A.
Figure 11:
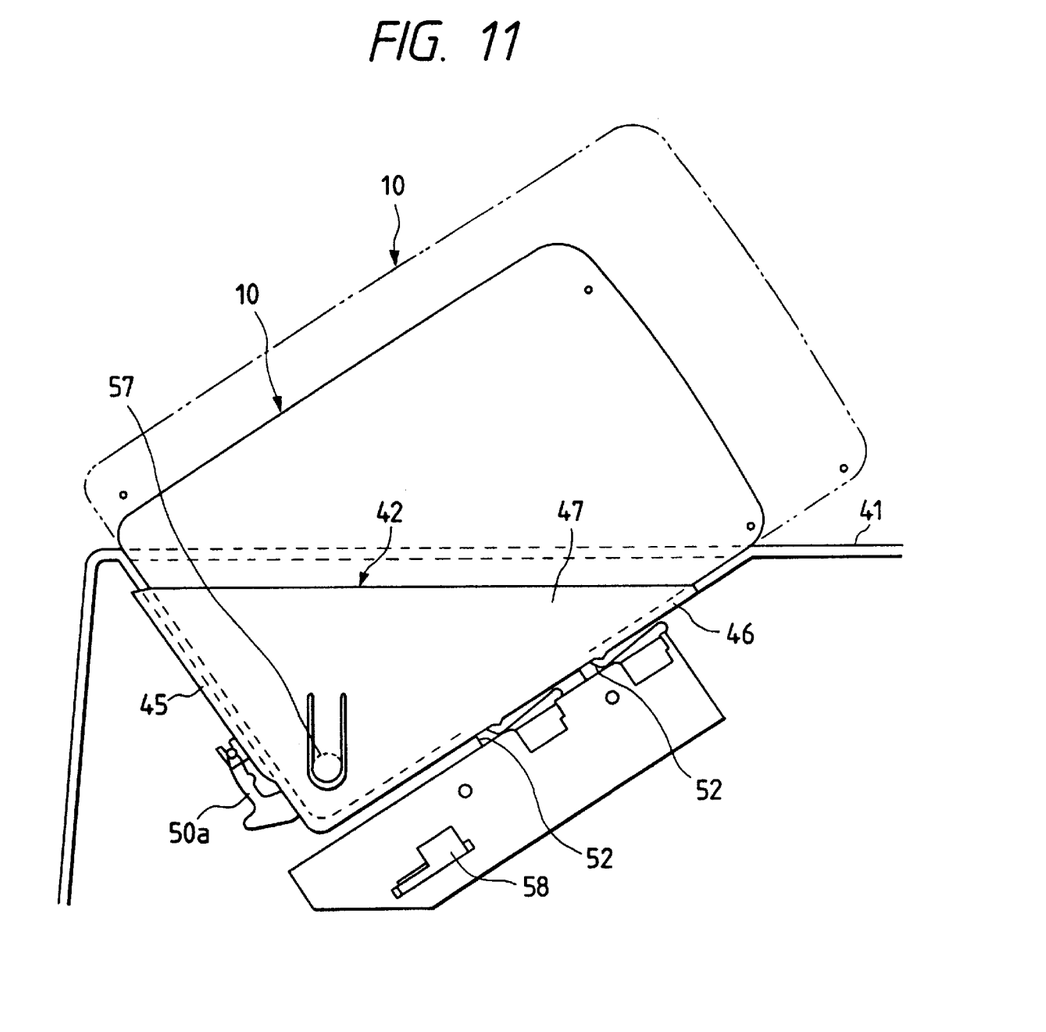
FIG. 11 is a diagram showing the state where the portable device of a small size (solid line) or a large size (two-dot chain line) is set in the device receiving unit.
Figure 12:
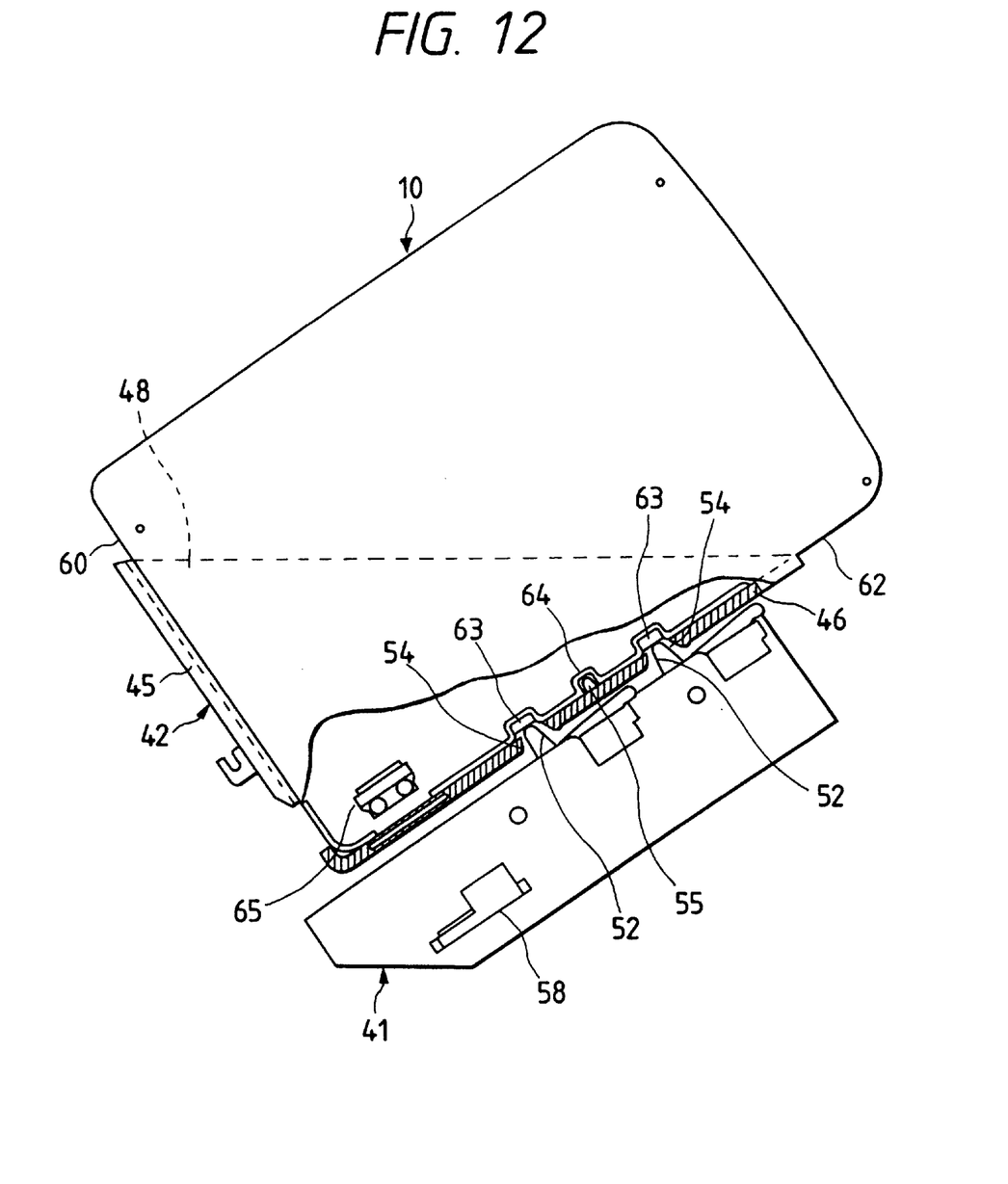
FIG. 12 is a diagram, partly broken and seen from the front of the device receiving unit with a front-side wall thereof being omitted, for explaining electric connection between the concentrator and the portable device in the state where the portable device is set in the device receiving unit.

FIGS. 9–12 are diagrams showing a concentrator 40 according to a second preferred embodiment of the present invention, wherein FIG. 9 is a partly broken front view of the concentrator 40 showing a schematic structure thereof in the state where the portable devices 10 of small and large sizes are set in device receiving units 42 of the concentrator 40, FIG. 10A is a diagram showing an internal structure of one of the device receiving units 42 of the concentrator 40, as seen from the rear of the device receiving unit 42 with a rear-side wall 48 thereof being omitted, FIG. 10B is a diagram showing the device receiving unit 42 as seen in a direction A indicated in FIG. 10A, FIG. 10C is a diagram showing the device receiving unit 42 as seen in a direction B indicated in FIG. 10A, FIG. 11 is a diagram showing the state where the portable device 10 of a small size (solid line) or a large size (two-dot chain line) is set in the device receiving unit 42, and FIG. 12 is a diagram, partly broken and seen from the front of the device receiving unit 42 with a front-side wall 47 thereof being omitted, for explaining electric connection between the concentrator 40 and the portable device 10 in the state where the portable device 10 is set in the device receiving unit 42.

The concentrator 40 is used for inputting data from a host computer into the portable device 10 or from the portable device 10 into the host computer, or feeding the power to the portable device 10.

The concentrator 40 includes a concentrator body 41 and a plurality of the device receiving units 42 mounted on the concentrator body 41. The concentrator body 41 has a box-like shape and is provided with a plurality of unit sections 41a (four unit sections in this embodiment) from one side to the other. In each of the unit sections 41a, a plurality of fixing bosses 43, 44 are provided at upper inner surfaces of the concentrator body 41 for attaching the device receiving unit 42 to the concentrator body 41.

As shown in FIGS. 9 and 10A–10C, each of the device receiving units 42 has a space 53 for receiving therein the portable device 10 of a thin box shape. Specifically, the device receiving unit 42 includes a confronting wall 45 orienting against an insertion direction of the portable device 10 for receiving it thereon, a bottom wall 46 extending perpendicular to the confronting wall 45 for supporting thereon the portable device 10 inserted and set, the front-side wall 47 for facing the front side of the portable device 10, and the rear-side wall 48 arranged parallel to the front-side wall 47 so as to face the rear side of the portable device 10. The device receiving unit 42 is open at its upper and device insertion entrance sides. The front- and rear-side walls 47 and 48 extend from corresponding free ends of the confronting wall 45 to corresponding free ends of the bottom wall 46 so that the device receiving unit 42 reveals a triangular shape in the front and rear views as best shown in FIGS. 10A and 11. At upper end portions of the front- and rear-side walls 47 and 48 are provided mounting flanges 49 and 50 for attaching the device receiving unit 42 to the concentrator body 41.

The device receiving unit 42 is suspended at the ceiling of the concentrator body 41 in the corresponding unit section 41a by securing the mounting flanges 49 and 50 to the fixing bosses 44 and 43, respectively. At this time, by adjusting relative positions of the fixing bosses 44 and the mounting flange 49 and relative positions of the fixing bosses 43 and the mounting flange 50 and further adjusting coupling angles therebetween, the device receiving unit 42 can be inclined from the device insertion entrance side toward the confronting wall 45 and from the front to the rear, that is, the device receiving unit 42 can be inclined from the horizontal plane relative to two orthogonal coordinate axes. In this embodiment, the device receiving unit 42 is gradually inclined downward from the device insertion entrance side toward the confronting wall 45 to provide a bottom at the junction between the confronting wall 45 and the bottom wall 46 (see FIG. 10A), and further gradually inclined downward from the front to the rear (see FIG. 9). It may be arranged that the device receiving unit 42 is inclined downward from the rear to the front.

At a lower end portion of the confronting wall 45 is provided a detecting portion 51 for detecting a position of the portable device 10 when it is set in the device receiving unit 42. Specifically, the detecting portion 51 is provided with a detecting mechanism 50a (see FIG. 11) for detecting the setting of the portable device 10 into the device receiving unit 42. As seen from FIG. 11, the detecting mechanism 50a includes a pivotal strip which moves out when the portable device 10 is set in the device receiving unit 42, so that the setting of the portable device 10 is detected. On the other hand, the bottom wall 46 is formed with openings 54 through which charging terminals 52 mounted on the concentrator body 41 protrude into the receiving space 53 of the device receiving unit 42, respectively. The bottom wall 46 is further formed on an inner surface thereof with a positioning projection 55 for positioning the portable device 10 when it is set in the device receiving unit 42. Further, near the confronting wall 45, the bottom wall 46 is provided with an optical communication section 56 through which the portable device 10 set in the device receiving unit 42 performs an optical communication. On the other hand, the front-side wall 47 is provided with a holder spring 57 which is prepared by blanking a portion of the front-side wall 47 in the form of a U-shaped slit. The concentrator body 41 is provided with an optical communication element 58 of the concentrator 40 at a position corresponding to the optical communication section 56. In the device receiving unit 42, positions of the detecting portion 51, the openings 54, the positioning projection 55 and the optical communication section 56 are precisely determined using the confronting wall 45 and the rear-side wall 48 as the reference planes. An interval between the front- and rear-side walls 47 and 48 of the device receiving unit 42 is set to be large enough to loosely receive the portable device 10 having a large thickness.

On the other hand, in the portable device 10, among four walls defining the contour of the portable device 10 within the device receiving unit 42, the wall 60 for abutting the confronting wall 45 of the unit 42 and the wall 61 for abutting the rear-side wall 48 of the unit 42 are used as the reference planes. Specifically, the wall 62 of the portable device 10 for abutting the bottom wall 46 of the unit 42 is provided with charging terminals 63, a positioning hole 64 and an optical communication element 65 whose positions are precisely determined using the walls 60 and 61 as the reference planes. Thus, irrespective of the size of the portable device 10, the charging terminals 63, the positioning hole 64 and the optical communication element 65 are arranged at the same positions on the wall 62 with respect to the reference planes (60,61). As appreciated, the positions of the charging terminals 63, the positioning hole 64 and the optical communication element 65 of the portable device 10 just correspond to those of the openings 54 (charging terminals 52), the positioning projection 55 and the optical communication section 56 of the device receiving unit 42, respectively.

With the foregoing arrangement, the portable device 10 of any size within a given range can be set in each of the device receiving units 42 of the concentrator 40. For example, if the small-size portable device 10 is set, the walls 60, 61 and 62 thereof abut the walls 45, 48 and 46 of the device receiving unit 42, respectively. Further, even if the portable device 10 is small in thickness, the portable device 10 is biased by the holder spring 57, at a side thereof opposite to the wall 61, toward the rear-side wall 48 of the unit 42 so that the wall 61 is pressed against the rear-side wall 48 to avoid an occurrence of backlash. On the other hand, even if the large-size portable device 10 is set, the walls 60, 61 and 62 thereof similarly abut the walls 45, 48 and 46 of the device receiving unit 42, respectively. As described above, since the device receiving unit 42 is open at its upper and device insertion entrance sides, those portions of the portable device 10 which can not enter the unit 42 are allowed to protrude from the unit 42 at its upper and device insertion entrance sides regardless of the size of the portable device 10.

Further, as described above, the positions of the detecting portion 51, the openings 54, the positioning projection 55 and the optical communication section 56 are precisely determined using the confronting wall 45 and the rear-side wall 48 as the reference planes in the device receiving unit 42, while the positions of the charging terminals 63, the positioning hole 64 and the optical communication element 65 are precisely determined using the walls 60 and 61 as the reference planes in the portable device 10 so as to precisely correspond to the positions of the associated elements of the unit 42. Thus, even if the portable device 10 of any size within the given range is set in the device receiving unit 42, the dislocation of the associated elements between the portable device 10 and the device receiving unit 42 is fully prevented so that the data transmission and reception and/or the power feeding relative to the portable device 10 can be reliably achieved. As appreciated, the matching of the associated elements between the portable device 10 and the device receiving unit 42 is facilitated by the inclination of the device receiving unit 42 relative to the horizontal plane. Further, if a plurality of the portable devices 10 of the same or different sizes are set in the device receiving units 42, the data transmission and reception and/or the power feeding relative to the portable devices 10 can be reliably achieved with the single concentrator 40.

While the present invention has been described in terms of the preferred embodiments, the invention is not to be limited thereto, but can be embodied in various ways without departing from the principle of the invention as defined in the appended claims.

What is claimed is:

1. A portable device comprising:

a portable device body;

a touch panel provided on a surface of said device body;

a cover coupled to said device body for covering said touch panel when it is closed and uncovering said touch panel when it is opened;

a window provided in said cover to allow said touch panel to be seen through said window when the cover is closed; and a button provided at a position on said cover corresponding to said touch panel, said button being operable from an outer side of said cover to control an operation of said touch panel while said cover is closed, wherein said button comprises an elastic material supported in a mounting hole formed through said cover from said outer side to a reverse side, by engagement between a portion of said button inside said mounting hole and a portion of said cover inside said mounting hole so as to be elastically deformable in directions toward and away from said touch panel when said cover is closed.

2. The portable device according to claim 1, wherein said button is provided at an outer periphery thereof with a radially inward engaging groove extending circumferentially, and wherein said button is supported in said mounting hole by engagement between said engaging groove and a mounting flange formed in said mounting hole of said cover.

3. The portable device according to claim 2, wherein said mounting flange has an annular shape with an upper surface which gradually inclines downward in a radially inward direction.

4. The portable device according to claim 1, wherein said button is provided at an outer periphery thereof with a radially outward mounting flange extending circumferentially, and wherein said button is supported in said mounting hole by engagement between said mounting flange and an engaging groove formed in said mounting hole of said cover.

5. The portable device according to claim 2, wherein said button has a protruding portion at its tip at a side of said cover opposite to said outer side, said protruding portion having a convex end.

6. The portable device according to claim 1, wherein said cover is coupled to said device body via a hinge mechanism, said hinge mechanism comprises said cover, a hinge strip and a hinge pin for coupling said cover and said hinge strip, wherein a first recessed portion is provided at a coupling portion of one of said cover and said hinge strip for receiving therein a coupling portion of the other of said cover and said hinge strip, said one of said cover and said hinge strip further provided with a guide groove extending through a portion thereof from its outer side and opening to said first recessed portion while said other of said cover and said hinge strip is provided at the coupling portion thereof with a second recessed portion corresponding to said guide groove, and wherein said cover and said hinge strip are coupled to each other by inserting said hinge pin through said guide groove to engage into said second recessed portion.

7. The portable device according to claim 6, wherein a locking mechanism is provided at said guide groove and said hinge pin for locking said hinge pin at said guide groove.

* * * * *